June 2, 1936.  E. J. MARTIN  2,043,053
QUANTITATIVE SPECTROSCOPIC ANALYSIS AND APPARATUS THEREFOR
Filed Aug. 29, 1932  3 Sheets-Sheet 1
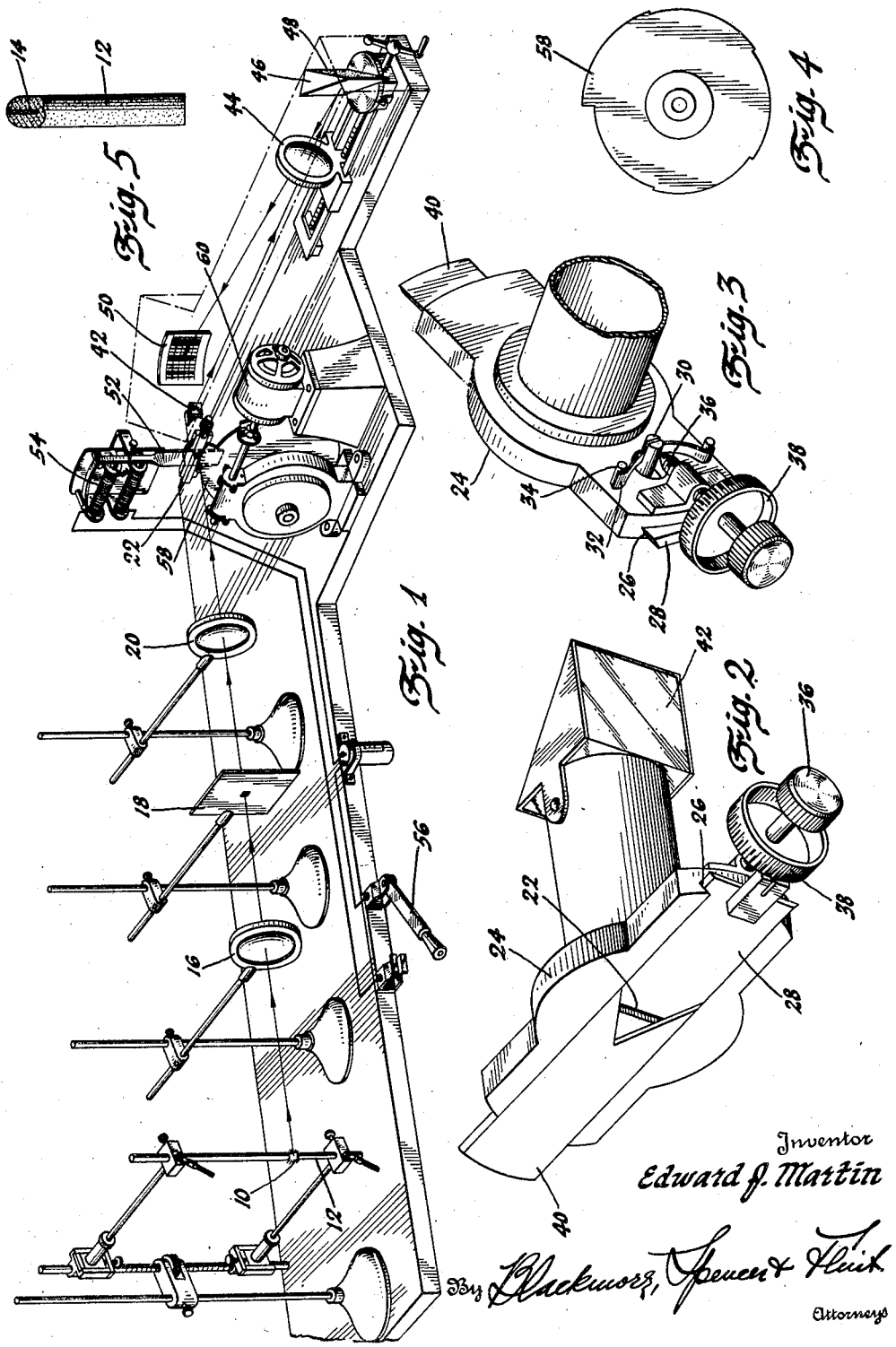
Inventor
Edward J. Martin
By Blackmore, Spencer & Flint
Attorneys June 2, 1936. E. J. MARTIN 2,043,053
QUANTITATIVE SPECTROSCOPIC ANALYSIS AND APPARATUS THEREFOR
Filed Aug. 29, 1932 3 Sheets-Sheet 2
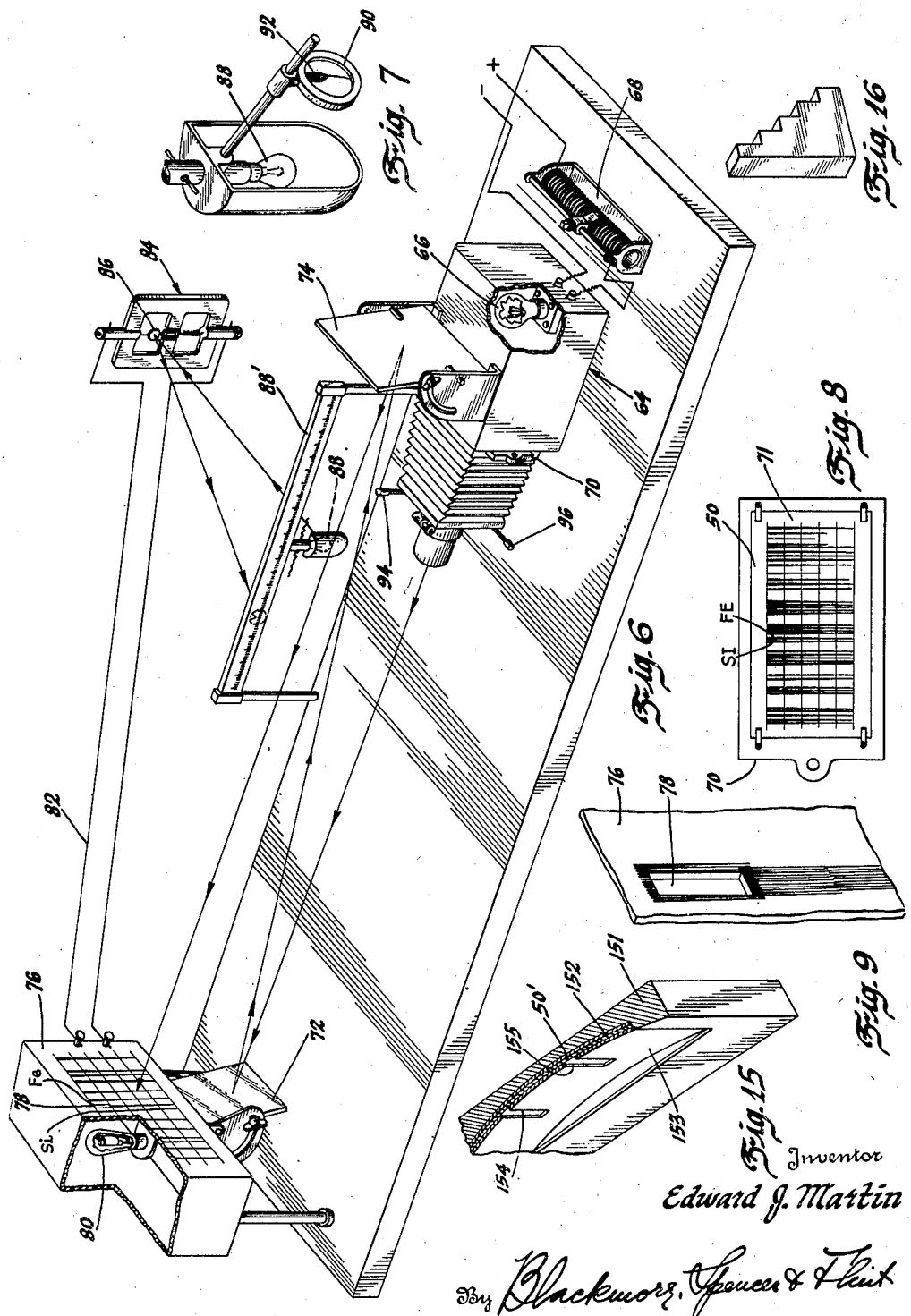
Inventor
Edward J. Martin
By Blackmore, Spencer & Flint
Attorneys June 2, 1936. E. J. MARTIN 2,043,053
QUANTITATIVE SPECTROSCOPIC ANALYSIS AND APPARATUS THEREFOR
Filed Aug. 29, 1932 3 Sheets-Sheet 3
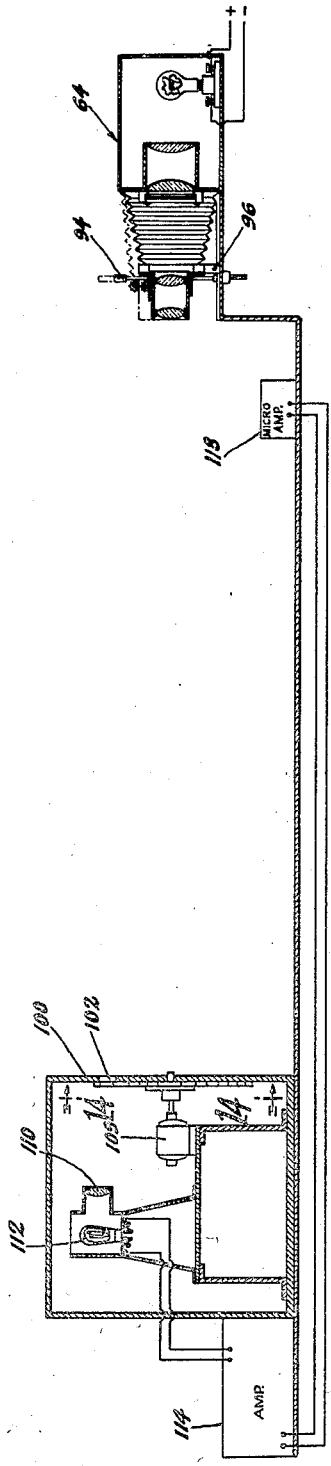
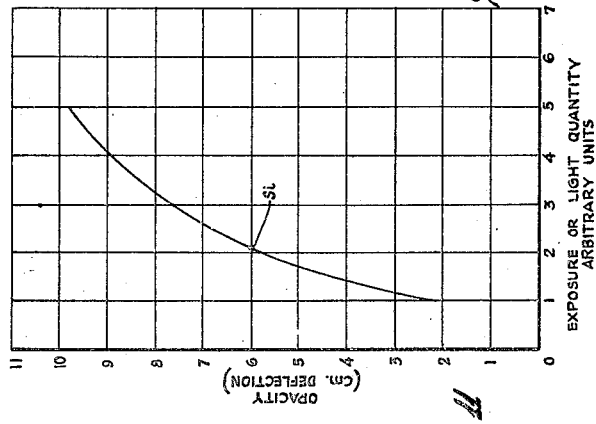
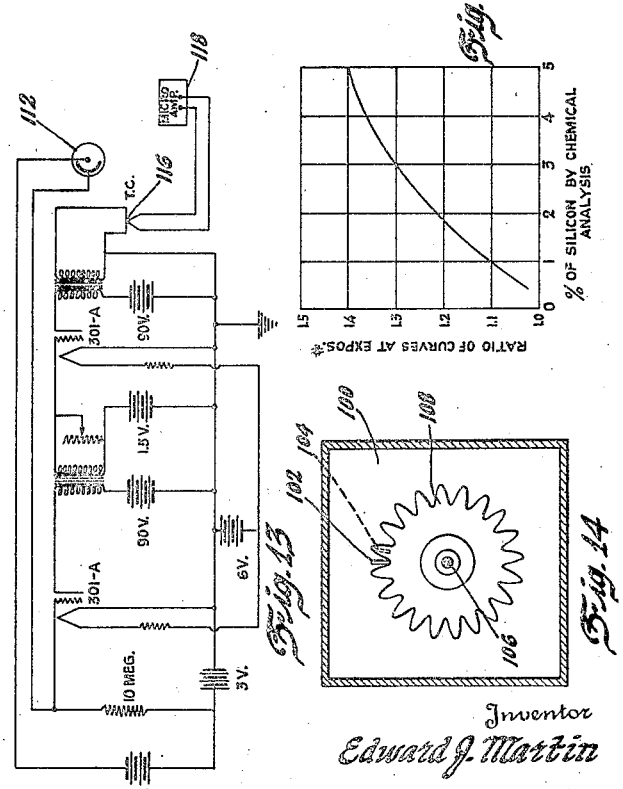

Patented June 2, 1936

2,043,053

UNITED STATES PATENT OFFICE 2,043,053

QUANTITATIVE SPECTROSCOPIC ANALYSIS AND APPARATUS THEREFOR

Edward J. Martin, Ferndale, Mich., assignor, by mesne assignments, to General Motors Corporation, Detroit, Mich., a corporation of Delaware Application August 29, 1932, Serial No. 630,891

3 Claims. (Cl. 88—14)

This application for patent presents the results of a long period of research having as its object a simple, practical method of quantitative spectroscopic analysis. The demand for the method came from metallurgists who encountered difficulty in controlling composition of melts owing to the fact that the methods of chemical analysis were so slow that by the time the analysis was completed the composition of the melt had so changed that the proper time for pouring had passed. The metallurgists desired a speedy accurate method that would overcome this difficulty.

The method described in this application has proven to be rapid, accurate and practical, and fills the need which led to the investigation. Like prior methods of analyzing materials by study of the spectrum, it is of almost universal application, and affords a degree of accuracy in some cases beyond that obtainable by chemical methods. It also permits measurements of quantities of materials difficult or impossible to separate from other ingredients by chemical methods.

One of the chief advances of my method consists in the incorporation of photographic plate calibration markers in the spectrogram itself. Such calibration marking is essential where photographic methods of measurement are employed, due to the fact that these factors materially alter the opacity of the images of the lines of the spectrum and prevent the opacity from being a true measure of the intensity of the corresponding line in the spectrum. Since the opacity of the lines also varies with the wave length, by incorporating the plate calibration markers in the lines of the spectrum whose intensities are to be compared, the maximum accuracy is obtained. At the same time I accomplish a substantial simplification of the process.

In previous plate calibration markers a scale of graduated opacity has been obtained by projecting light of uniform brightness through slots of graduated area, and focusing the bands of light on equal areas of the plate. This method requires an additional operation in placing the pattern on the photographic plate. According to my method the exposure of different portions of each of the spectral lines is varied in known ratio by employing suitable means such as a movable shutter having cut-off portions similarly graduated. By this means I attain both simplicity and greater accuracy.

I have likewise substantially improved the method of measuring the opacity of the lines on the spectrogram. This has been accomplished by inserting the spectrogram in a projecting lantern that casts an enlarged image of the spectrogram on a screen. The screen is provided with an aperture which receives light coming through the lines whose opacities are to be measured. A suitable light measuring device is arranged to receive the light coming through the aperture. By this means the opacity of each of the segments of a selected line may be measured and plotted against the exposures which, in turn, are proportional to the quantities or intensities of light in the corresponding lines of the spectrum. By now measuring the opacity of one portion of another spectral line and comparing the exposure of said portion with the exposure of the corresponding part of the first line a ratio of exposures or light quantities is obtained which is peculiar to the particular concentration of the second element in the material. By compiling the results of similar tests of elements of known composition, it is possible to evaluate any subsequent light quantity ratio in terms of percentage of the element, thereby performing the analysis.

The complete process requires only the photographing of a portion of the spectrum of the material to be analyzed, projecting the image of the photograph on a screen, making a few opacity measurements,—not to exceed six according to my preferred method,—to obtain the desired light quantity ratio which may then be evaluated from data previously compiled. The apparatus may be so designed that an unskilled person may perform the operations. The expense of the analysis is confined to the preparation of the arc source if that method of excitation be employed, the cost of the small portion of sensitized material used to receive the spectrogram, and a few minutes of the time of an unskilled operator.

In developing this method, improvements have been made in the apparatus as well. My invention includes improvements in the spectrograph to incorporate the calibration marker in the spectogram; improvements in densitometers for measuring the opacities of the selected lines; improvements in spectrograms by incorporating the opacity calibration marker therein; improvements in design of the electrode used to hold the sample of material to be tested; and other details which will be pointed out in the course of the following description.

Figure 1 is a perspective view showing the arrangement of spectrograph as developed for laboratory use.

Figure 2 is a detail showing the adjustment of the slit.

Figure 3 is a rear view of the elements shown in Figure 2.

Figure 4 is a face view of the variable cutoff shutter which is an important feature of my invention.

Figure 5 is a view, partly is section, showing the preferred form of cathode used in producing the arc.

Figure 6 is a perspective view of the projection type densitometer as set up in the laboratory for use in accordance with my invention.

Figure 7 is a perspective view of the projector used to provide an indicator for the densitometer.

Figure 8 shows a portion of spectrogram made according to my invention.

Figure 9 is an enlarged view showing the portion of the screen having the slot therein to receive the light passing through a portion of a spectral line.

Figure 10 illustrates an opacity-exposure or light quantity curve obtained by the employment of my method.

Figure 11 shows a typical master curve indicating the relation between percent of one of the elements and the corresponding ratio of exposures or light quantities.

Figure 12 is a horizontal sectional view showing a modified form of densitometer.

Figure 13 illustrates diagrammatically the amplifying apparatus used with the densitometer of Figure 12.

Figure 14 is a section on line 14—14 of Figure 12.

Figure 15 shows a modified method of mounting the photographic plate in the spectrograph.

Figure 16 indicates a stepped optical "wedge" which may be used in place of the stepped disc of Figure 4.

In general, my method follows previous practice in that I select for study a pair of spectral lines, one of a base material, and the other of the material to be measured. I study these lines by making photographs of them, measuring the opacities of the photographed lines and converting the measured opacities into the corresponding exposures or light quantities to obtain the desired light quantity or intensity ratio. For the manner of selection of the spectral lines reference must be made to the voluminous literature on spectroscopy.

To obtain a photograph of the portion of the spectrum selected I have used the apparatus as shown in Figure 1.

As a source of light I have employed an arc indicated at 10. The cathode or negative electrode 12 is shown in Figure 5. It is made of spectrographically pure carbon or graphite, and is provided with a hole or socket 14 within which are placed particles of the material to be tested. It was found that the shape of the end of the cored electrode had an important effect on the steadiness of the arc. In the case of analyses of cast iron for silicon content it was found best to give the end of the electrode a hemispherical shape. When a conical shape was made use of the arc was very unsatisfactory. It is indicated that the curvature necessary to be given the end of the arc will vary in accordance with the strength of the current and the size of the hole in the electrode. In the case of the iron analyses mentioned above I employed holes of approximately ⅛" in diameter, thereby being able to use larger fragments of the metal without special grinding.

It may also be found desirable to employ neutral materials in the electrode to steady the arc. In the case of the iron analyses mentioned the use of ferric sulphate, ferric chloride, or calcium sulphate is suggested.

I also have found it best to obtain light from the part of the arc known as the region of the cathode fall. This region is characterized by ionization, and the fact that the electric field is a constant determined by the materials in the electrodes and is very steady and reproducible.

For details of the method of arc control, which I found useful, attention is called to an article by R. Mannkopff and C. L. Peters, contained in the July, 1931, issue of "Zeitschrift für Physik."

While I have described the preferred method of obtaining light from the material to be tested it is to be understood that other means of excitation may be employed such as the spark, flame, or gaseous discharge in tubes.

Light from the region of cathode fall is projected on the slit of the spectrograph by the use of a suitable optical train to enlarge the image of the region to workable size, together with a screen which serves to exclude other light. For the optical train I have preferred to use a lens 16 having one focus at the arc and the other focus at an aperture in screen 18 which excludes all but the light desired, together with a second lens 20 which forcuses the light on the slit 22 of the spectrograph.

The spectrograph itself is conventional, and may consist of a suitable housing indicated by dot and dash lines in Figure 1, provided at one end with suitable devices for adjusting the width and length of the slit 22. I have indicated a frame 24 provided with a guideway 26 within which are slidably mounted the slide 28 provided with a stud 30 projecting through an aperture in the rear of the frame 24 and yieldingly urged toward the left as illustrated in Figure 3 by means of leaf spring 32 engaging the stud 30 on the slide and studs 34 on the frame 24. An adjusting screw 36 is threadedly mounted on the guide 24, and engages stud 30 at one end. This screw may be provided with a graduated knob 38, and the slide 28 may be provided with an indicator as shown for indexing the adjusting screw. By moving the slide 28 back and forth the width of the slit 22 may be adjusted.

There is also mounted within the guideway 26 a slide 40 having its inner end notched as shown. By adjusting this slide back and forth the length of the slit may be increased or decreased as desired.

The light passing through the slit 22 is redirected at right angles by the total reflecting prism 42, passes through lens 44, and through prism 46 having its rear face 48 silvered. The light is reflected from the silvered face 48, again passes through lens 44, and is projected upon photographic plate 50 mounted in the spectrograph, preferably in the manner shown in Figure 15. The prism 46 analyzes the light into its component rays in known manner, the result being an image of the spectrum, or rather of a portion of the spectrum, on the photographic plate 50. The lens 44 and prism 46 may be mounted for adjustment in the manner shown. This arrangement of prism 46 is known as Littrow mounting, and is well known in the art.

I have preferably provided a shutter for intercepting the light passing through the slit to control the period of exposure. The shutter is indicated at 52, and may be actuated in any suitable manner by electromagnets 54 whose circuit may be controlled by a suitable switch 56.

An important feature of my invention consists of the sectored disc 58 shown in detail in Figure 4. This disc may be driven by motor 60 through any suitable gearing, and provision may be made for regulating the speed as desired. It should be capable of rotation at high speed, for example, in the neighborhood of several thousand R. P. M.

The disc 58 is provided with a stepped periphery as shown. Each of the steps covers the same angular distance, and the steps are preferably of equal height as shown. The distance between the lowest step and the highest step is preferably equal to the height of the slit and the disc is so arranged that when the highest step is opposite the slit, light is entirely cut off from it. The disc effectively divides the spectrogram transversely into five parts or exposures as shown in Figures 1 and 8, the times of exposure bearing a definite relation to each other; for example, the lowest portion of the slot is uncovered only during the portion of a revolution during which the lowest step is moving across the bottom of the slit. This period of time is taken as one unit of exposure. The portion of the slit next above is exposed to light during the period in which the two bottom steps are passing across the slot. Since the steps are of equal angular extent this period of time is equal to two units of exposure. The periods of exposure of the remaining portions of the slot are also multiples of the period of exposure of the bottom portion so that a spectrogram 71 is obtained, as shown in Figure 8, consisting of five portions of graduated opacity corresponding to the graduated exposure times.

I have shown in Figure 15 a modified mounting for the photographic plate 50. The mounting consists of a support 151 carrying fixed guides 152 and 153 between which the photographic plate or film 50' may be inserted. The guide 153 is opaque, and is provided with slots 154 and 155. These slots are so arranged as to receive a few only of the spectral lines including those to be measured. A series of guides 153 may be provided having slots corresponding to the spectral lines needed for analysis of different materials. By selecting the proper guide and mounting it in the plate holder, the operator thereafter need do nothing but insert the plate in position whereupon the proper lines will be photographed. This greatly simplifies the operation.

It will be noted that the photographic plate 50 of Figure 1 as well as the plate 50' of Figure 15 are curved. This is because the spectroscope, arranged as shown, brings different lines to a focus at different distances from the lens, in known manner.

I have found it desirable to use photographic plates of such type that they may be developed and fixed with great rapidity since speed of analysis is desired. The following kinds of photographic plates have proven to be especially desirable for this use: Printon plates made by Agfa Ansco, Contrasto plates made by Difender Photo Supply Co., and Kodalith plates made by Eastman Kodak Company. In practice I prefer to use film rather than glass plate, but it will be understood that where the term "plate" is employed in the specification or claims I have in mind simply a supporting surface for the light sensitive emulsion whatever be the material of which that supporting surface is made.

The lines of the spectrograms as shown in Figure 8 have the appearance of tapering in width due to the effect of halation. However, each of the portions of stepped opacity will be found to contain a central strip, parallel to the length of the step, having uniform opacity.

It has been suggested that in place of the stepped disc indicated in Figure 4 a stepped wedge such as shown in Figure 16 may be used, the wedge consisting of such material as will have as nearly as possible the same absorbing power for light of all colors and cutting down the quantity of light as the steps increase in thickness by amounts lost by absorption. Since the thickness of succeeding steps are multiples of the thickness of the first step a similar gradation of opacities is obtained. I regard this as simply an inferior variant of my stepped disc method.

The next step consists in measurement of the opacity of selected spectral lines. While these lines may be lines of the same chemical element, I prefer to employ a line of a base material together with a line of the element to be measured. Thus in the case of iron used in casting brake drums and other articles where it was desired to control the silicon content with great accuracy I employed a silicon line with an iron base line.

It is to be understood, of course, that I am using analysis of iron for silicon content simply as one example, and that my method is of broad utility, and may be used for the analysis of any kind of material practically regardless of its physical form, provided the element, or elements to be measured produce spectral lines.

To measure the opacities of the spectral lines I may employ any suitable apparatus, but have found it most convenient to use the densitometer of special design hereinafter described. In designing this densitometer I have borne in mind the need for simplicity so that the measurements may be made by an unskilled operator.

My densitometer consists essentially of apparatus for projecting enlarged images of the spectral lines on a suitable screen provided with an aperture or apertures through which light passing through a portion of any desired line may be projected onto the light sensitive element of a light measuring device, such as a thermocouple, a radiometer, a bolometer or a photoelectric cell. I have had particular success with the "Weston photronic" cell which requires no amplification.

A laboratory setup of my apparatus is shown in Figure 6. Here 64 indicates any suitable type of projecting apparatus provided with a source of light 66 of any suitable type. In order to secure uniformity in results it is essential that the voltage on the lamp 66 be maintained constant. For this purpose I may use storage batteries to supply current to the lamp, and may, if desired, insert a suitable rheostat 68 in the circuit to provide adjustment. The spectrogram mounted in its frame 70 is inserted in position in the projector. The image of the lines on a spectrogram is preferably enlarged by suitable lenses in the usual way.

To make possible the use of cheaper lenses in the projector and ease of adjustment I have increased the distance of projection without increasing the length of the apparatus by employing mirrors 72 and 74 in series to reflect the image on a screen 76. By using the mirrors the screen is brought nearer to the eye of the operator so he can more accurately and quickly adjust the line on the slot. Screen 76 is provided with a slot 78 which is of sufficient size to include within it the uniformly illuminated area of the image of one section of a spectral line. Back of the slot is arranged the light sensitive element, here shown as a photoelectric cell 80 arranged in circuit 82 which also includes a sensitive galvanometer provided with mirror 86 so as to indicate its deflection by means of the conventional lamp 88 and scale 88'.

With the desired arrangement the reading on the scale 88' is a measure of the amount of light passing through the section of the line of the spectrogram. To permit measurement of the successive sections of the line I have provided the projector with an elevating screw 94. I have indicated at 96 an adjusting screw to move the image laterally on the screen to bring other spectral lines over the slot.

In carrying out my process the apparatus shown in Figure 6 is used to measure the opacity of each of the stepped segments of the iron line, and for convenience the results may be plotted against exposure or light quantities as shown in Figure 10. The resultant curve shows the relation between opacity and the quantity of light in the spectral line producing the image on the plate and serves as a calibration curve for that particular plate.

At the same time that the opacity of the iron line is measured with the apparatus of Figure 6 the opacity of one section of the selected silicon line is likewise measured. An iron line is chosen as standard in this case because there is so much iron present in all "irons and steels" that the intensities of its lines are constant for all samples. In other materials the same idea is carried out. I prefer to measure the opacity of the middle section. In the illustration given, the opacity measurement was found to be six, and by applying this measurement to the curve of Figure 10, a value of approximately $2\frac{3}{10}$ is obtained for the corresponding light quantity. The light quantity for the middle segment of the iron line is three since the shutter shown in Figure 4 is designed so that the period of exposure in the case of the middle segment is three times as long as in the case of the bottom segment. Therefore the ratio of light quantities of iron to silicon is $$\frac{3}{2.3} = 1.3.$$

The next step consists in evaluating this ratio in terms of silicon content. To accomplish this it is necessary to prepare a series of specimens of known silicon content, make a spectogram of each and obtain the corresponding ratio of light quantities of the selected lines in the manner just described. The results are plotted in Figure 11. Interpolating the ratio of light quantities for the unknown on the curve of Figure 11, the silicon content is determined to be 3%.

In general, it is not essential to my process that the series of specimens be identical. It is merely necessary that the variations in their content are not sufficiently wide as to seriously alter the relations between the spectral lines. For example, specimens may be used containing elements not present in other specimens of the same series. Nor is it essential that the physical forms of the specimens be identical, for some may be alloys, while others may be conglomerates or physical mixtures.

In Figures 12 to 14 I have shown an alternative method of measurement of opacities of the lines of the spectrogram employing a quick acting photoelectric cell together with an amplifier to increase the current fluctuations produced by variations in light. The projecting lantern 64 may be the same as that previously described with vertical adjusting screw 94 and horizontal adjusting screw 96 to enable measurement of successive segments of adjacent spectral lines. The projector throws the spectral pattern on screen 100 as before. This screen is provided with slot 102 to receive the image of a portion of a spectral line and with a second slot 104. The slots 102 and 104 lie along radii from a common center 106. There is rotatably mounted about the center 106 a disc 108 having teeth on its periphery made in the form of a sine wave. The slots 102 and 104 are spaced by a distance equal to one-half of the pitch of the teeth. The slots are preferably slightly longer than the disc teeth. The disc 108 is driven by means of an electric motor 109. The light passing through the slots is condensed by means of lens 110, and small images of the source through the two slots are focussed on the target of the photoelectric cell 112. In my preferred construction this condensed image is but $\frac{1}{16}''$ in diameter so that only a small portion of the target of the photoelectric cell is used, thus removing possible sources of error due to irregularities in sensitivity of the target surface. 114 indicates an alternating current amplifier which may consist of two vacuum tubes coupled by a transformer. The current from the photoelectric cell 112 is fed to the grid of the first tube. The amplifier may feed into a vacuum thermocouple heater, indicated at 116, the thermocouple of which is connected to a microammeter 118.

I have indicated in Figure 13 a conventional circuit which may be used for amplification, but it will be understood that this is subject to considerable variation in practice.

This form of densitometer has the advantage that the errors due to variations in background, such as fogging, are greatly reduced. This reduction results from the fact that the light falling on the photo-electric cell comes through two slots 102 and 104, each of which is subject to the same errors due to fogging. With the construction shown, if both slots are equally illuminated, the light falling on the cell is constant so that no reading is given by the microammeter for the amplifying system is responsive only to variations in current. When the image of a portion of a spectral line is projected on the slot 102 the rotation of the disc 108 produces variation in the amount of light falling on the cell 112. The two sine waves of current produced in the photoelectric cell circuit by the action of the light through the slots no longer counteract one another as the intensity through one slot is decreased by an amount equal to the density of the projected line. The overbalancing sine wave of current is amplified, and its proportion is read on the microammeter. The heaviest spectral lines produce the greatest amount of overbalance. The frequency of the overbalancing current is equal to the frequency of the teeth passing the slots, this, in one case, being about 300 cycles per second. By using a loading resistor on the secondary of the coupling transformer the sensitivity can be controlled at will. Up to the present time it has not been found necessary to use the highest sensitivity attainable with the two stage amplifier, even for the faintest lines studied.

With this arrangement the effects of variations in background are eliminated since it is the difference in intensity of light through the two slots that is measured. This method likewise has the advantage of permitting easy amplification because an alternating current is obtained. With this type of apparatus it is necessary to use a fast photo-electric cell. I have found the General Electric Company's high vacuum cell to be very satisfactory.

With the type of densitometer last described the data of Figures 10 and 11 may be obtained; this modification simply representing a variation in the method of measuring the opacities of the lines.

It will be appreciated that my method of quantitative spectroscopic analysis is especially adapted for use in production. The user will be provided with the spectrographic equipment described, and with a suitable densitometer, and with a set of master curves applying to the compositions with which he is dealing. To make an analysis it is but necessary to take a sample, insert it in the recess in the electrode, produce the arc, and take a photograph of the desired portion of the spectrum. The photograph may be developed, fixed and dried in less than a minute and placed in the projection apparatus to measure the opacities of the sections of the line of the base material to obtain the relation between opacity and light quantity or intensity; and to measure the opacity of one section of the element under test. From this the ratio of light quantities or intensities may be obtained, and this ratio may be evaluated in terms of the element by reference to a master curve.

All of the operation may be performed by unskilled workers but at the same time greater accuracy is obtained for the reason that the method of calibrating the plate is more accurate in that the calibration marker is built into the spectrum itself by varying the exposures of different portions of the spectral lines. By building the calibration marker into the spectrogram, errors arising from variation in wave length of the marker and of the lines measured, as well as errors arising from variation in sensitivity of the plate in different areas, are eliminated. Likewise the added complication of a separate calibration marker is avoided.

While I have employed a graduated calibration marker with five graduations, it will be understood that this has been done for convenience only, and that the number of graduations may be increased to infinity, if desired, thereby obtaining a complete opacity-light quantity or intensity curve and such variations are included within the scope of my invention. In the event that a continuous curve is employed, it is obvious that the points of equal exposure time on the two spectral lines should be employed to obtain the desired ratio.

It will be noted that the ratio obtained is one of exposures, but since the times of the exposure and the areas exposed are the same, the resulting ratio is also the ratio of intensities of the spectral lines in the source.

It will likewise be apparent that, if preferred, my plate calibration marker may be applied separately so that from one point of view my invention consists of a method of calibrating photographic plates for any, or all, portions of the spectrum by applying a marker characterized by variation in exposures.

I claim:

1. The method of quantitative spectroscopic analysis which comprises the following steps; causing the material to emit light; producing the spectrum of the material; recording on a photographic plate a portion of the spectrum including a line of the unknown element and a reference line; graduating the time of exposure throughout the length of each of the lines in steps of known ratio so as to graduate in like manner the quantity of light to which each portion is subjected; measuring the opacities of the different portions of the reference line to obtain a scale of opacities in terms of light quantities; measuring the opacity of a portion of the line of the unknown; evaluating the same in terms of light quantities by reference to the said scale; setting up a ratio of the light quantities forming corresponding portions of the line of the unknown and of the reference line; repeating the process with a series of standard electrodes containing the same kind of material but having the unknown element varied in known amount; evaluating the ratio of light quantities obtained from the unknown in terms of percentage of the substance by comparison with ratios of light quantities obtained from the standard series.

2. In the combination as defined in claim 1 the spectral line of the unknown and the reference line lying in substantially the same portion of the spectrum.

3. The method of quantitative spectroscopic analysis which comprises the following steps; causing the material to emit light; producing the spectrum of the material; recording on a photographic plate a portion of the spectrum including a line of the unknown element and a reference line; graduating the time of exposure throughout the length of the reference line in definite steps of known ratio so as to graduate in like manner the quantities of light to which each portion of the line is subjected, one of said steps corresponding with the time of exposure of a portion of the line of the unknown element, measuring the opacities of the different portions of the reference line to obtain a scale of opacities in terms of light quantities; measuring the opacity of said portion of the line of the unknown; evaluating the same in terms of light quantities by reference to the said scale; setting up a ratio of the light quantities forming said portion of the line of the unknown element and the corresponding portion of the reference line; repeating the process with a series of standard electrodes containing the same kind of material but having the unknown element varied in known amount; evaluating the ratio of light quantities obtained from the unknown in terms of percentage of the substance by comparison with ratios of light quantities obtained from the standard series.

EDWARD J. MARTIN.